US009050697B2

(12) United States Patent
Daskiewich

(10) Patent No.: US 9,050,697 B2
(45) Date of Patent: Jun. 9, 2015

(54) SELF-CONDITIONING POLISHING PAD AND A METHOD OF MAKING THE SAME

(71) Applicant: JH Rhodes Company, Inc., Tempe, AZ (US)

(72) Inventor: Scott B. Daskiewich, Oriskany, NY (US)

(73) Assignee: JH Rhodes Company, Inc., Tempe, AZ (US)

(*) Notice: Subject to any disclaimer, the term of this patent is extended or adjusted under 35 U.S.C. 154(b) by 58 days.

(21) Appl. No.: 13/797,121

(22) Filed: Mar. 12, 2013

(65) Prior Publication Data

US 2013/0252519 A1    Sep. 26, 2013

Related U.S. Application Data

(60) Provisional application No. 61/613,398, filed on Mar. 20, 2012.

(51) Int. Cl.
| | | |
|---|---|---|
| *B24D 11/00* | (2006.01) | |
| *B32B 5/22* | (2006.01) | |
| *B24B 37/24* | (2012.01) | |
| *B24B 37/26* | (2012.01) | |
| *C08J 9/35* | (2006.01) | |

(52) U.S. Cl.
CPC ............. *B24B 37/24* (2013.01); *B24B 37/26* (2013.01); *C08J 9/35* (2013.01); *C08J 2203/10* (2013.01); *C08J 2203/142* (2013.01)

(58) Field of Classification Search
USPC ............. 428/317.9, 315.5, 315.7; 451/526; 51/296
See application file for complete search history.

(56) References Cited

U.S. PATENT DOCUMENTS

| | | | |
|---|---|---|---|
| 6,790,883 | B2 | 9/2004 | Ogawa et al. |
| 6,913,517 | B2 | 7/2005 | Prasad |
| 6,992,123 | B2 | 1/2006 | Shiho et al. |
| 2004/0244299 | A1 | 12/2004 | Ogawa et al. |
| 2006/0128271 | A1 | 6/2006 | Shiho et al. |
| 2010/0221983 | A1 | 9/2010 | Lefevre et al. |

FOREIGN PATENT DOCUMENTS

| | | |
|---|---|---|
| KR | 1020050079631 | 8/2005 |
| KR | 1020090120553 | 11/2009 |
| WO | 2011087737 | 7/2011 |
| WO | 2012138705 | 10/2012 |
| WO | 2013142134 | 9/2013 |

OTHER PUBLICATIONS

International Preliminary Report on Patentability received in PCT/US2013/030353 dated Sep. 23, 2014.
International Preliminary Report on Patentability in Application No. PCT/US2012/032089 dated Oct. 17, 2013.
International Search Report and Written Opinion in Application No. PCT/US2012/032089 dated Oct. 25, 2012.
International Search Report and Written Opinion in Application No. PCT/US2013/030353 dated May 15, 2013.
Office Action dated Dec. 18, 2014 in Korean Application No. 10-2014-7029262.

*Primary Examiner* — Hai Vo
(74) *Attorney, Agent, or Firm* — Snell & Wilmer L.L.P.

(57) ABSTRACT

The present invention is directed to a self-conditioning polishing pad. The self-conditioning polishing pad comprises an insoluble polymeric foam matrix and insoluble polymeric foam particles within the foam matrix. The particles are coated with a water-soluble component over a portion of the surface area of the particle. The particles may have a diameter in the range of 5 to 1000 microns in diameter.

19 Claims, 3 Drawing Sheets

SELF-CONDITIONING POLISHING PAD AND A METHOD OF MAKING THE SAME

CROSS-REFERENCE TO RELATED APPLICATIONS

This application claims priority to U.S. Provisional Application No. 61/613,398, entitled "A Self-Conditioning Polishing Pad and a Method of Making the Same," which was filed on Mar. 20, 2012, the contents of which are hereby incorporated by reference for any purpose in their entirety.

FIELD OF INVENTION

The present invention is generally related to a self-conditioning polishing pad, comprising an insoluble polymeric foam matrix containing insoluble polymeric foam particles coated with a water-soluble component.

BACKGROUND OF THE INVENTION

In the common use of a polyurethane polishing pad, the pad surface which contacts the part to be polished is typically conditioned before and during polishing. One problem encountered during the use of polyurethane foam polishing pads is the continuous need to recondition the pact. Conditioning in most polishing applications involves moving a conditioning tool across the pad contact surface which creates a nap of sheared polyurethane, flattens out pad topography, and cleans out accumulated slurry and swarf from pores. A conditioning tool can comprise a metal puck that is impregnated on one side with diamond powder or another similarly hard abrasive material. In the normal course of polishing, a polishing pad will experience a decline in performance (i.e., Stock removal, part flatness, part defects, and/or surface roughness) that is related to the flattening of the polyurethane nap, changes in the pad topography, and dogging of pores with slurry and swarf.

Polishing pads are useful in many applications. Two such applications are polishing glass and polishing wafers. Regardless of the application, a polishing pad is moved relative to the object (e.g., glass, Si wafer, Sapphire wafer, etc.) being polished. This relative movement may be created by rotating the polishing pad, by rotating the object being polished, or a combination of such movements. Other linear or any useful relative motion may be used between the polishing pad and the object being polished. In some embodiments, a force may be applied to press the polishing pad in contact with the wafer.

The polishing may be performed to varying degrees such as to remove larger imperfections, to achieve a mirror finish and/or final flatness, etc.

Conventionally, the process of polishing silicon semiconductor substrate wafers to improve flatness is accomplished by a mechanochemical process in which one or more polishing pads, typically made of urethane, is used with an alkaline polishing solution (slurry), commonly comprising fine abrasive particles such as silica or cerium. The silicon wafer is supported between a platen covered with a polishing pad and a carrier to which the wafer is attached, or, in the case of double-sided polishing, the wafer is held between two platens, each covered with a polishing pad. The pads are typically about 1 mm thick and pressure is applied to the wafer surface. The wafer is mechanochemically polished by relative movement between the platen and the wafer.

During polishing, pressure is applied to the wafer surfaces by pressing the pad and the wafer together in a polishing tool, whereby a uniform pressure is generated over the entire surface owing to the compressive deformation of pads. Polishing tools often have dynamic heads which can be rotated at different rates and at varying axes of rotation. This removes material and evens out any irregular topography, making the wafer flat or planar.

Unfortunately, typical prior art polishing pads tend to need to be conditioned and therefore replaced frequently because conditioning removes a portion of the pad thickness. For example, such polishing pads may need to be replaced every 5-10 days. It is desirable to have a polishing pad that can maintain its optimal polishing performance longer before conditioning is necessary, thereby giving the polishing pad a longer polishing life. In this manner, more polishing can be performed and thus more product can be made in a set period of time. In this regard, it is desirable to have a polishing pad that is self conditioning.

SUMMARY OF THE INVENTION

The present invention is directed to a self-conditioning polishing pad. The self-conditioning polishing pad comprises an insoluble polymeric foam matrix and insoluble polymeric foam particles within the foam matrix. The particles are coated with a water-soluble component over a portion of the surface area of the particle. The particles may have a diameter in the range of 5 to 1000 microns in diameter.

BRIEF DESCRIPTION OF THE DRAWINGS

The subject matter of the present invention is particularly pointed out and distinctly claimed in the concluding portion of the specification. A more complete understanding of the present invention, however, can be obtained by referring to the detailed description and claims when considered in connection with the drawing figures, wherein like numerals denote like elements, and wherein:

DETAILED DESCRIPTION

In accordance with an exemplary embodiment of the present invention, a polishing pad is disclosed for use in polishing glass, silicon semiconductor substrate wafers, and Sapphire wafers (among other things). In this exemplary embodiment, the polishing pad is chemically and/or physically configured to comprise particles formed in the pad in such a manner that the pad is a self-conditioning pad. Stated another way, the pad can be configured to self condition so as to effectively function for longer periods of time without interruption of operation for conditioning relative to pads that are not so configured.

Polishing Pads

In accordance with an exemplary embodiment, a polishing pad may comprise a foam matrix and foam particles within the foam matrix. In an exemplary embodiment, the polishing pad comprises an insoluble polymeric foam matrix and insoluble polymeric foam particles within the insoluble polymeric foam matrix. The insoluble polymeric foam particles may be coated over a portion of the particles' surface area with a water soluble component.

Figure 1:
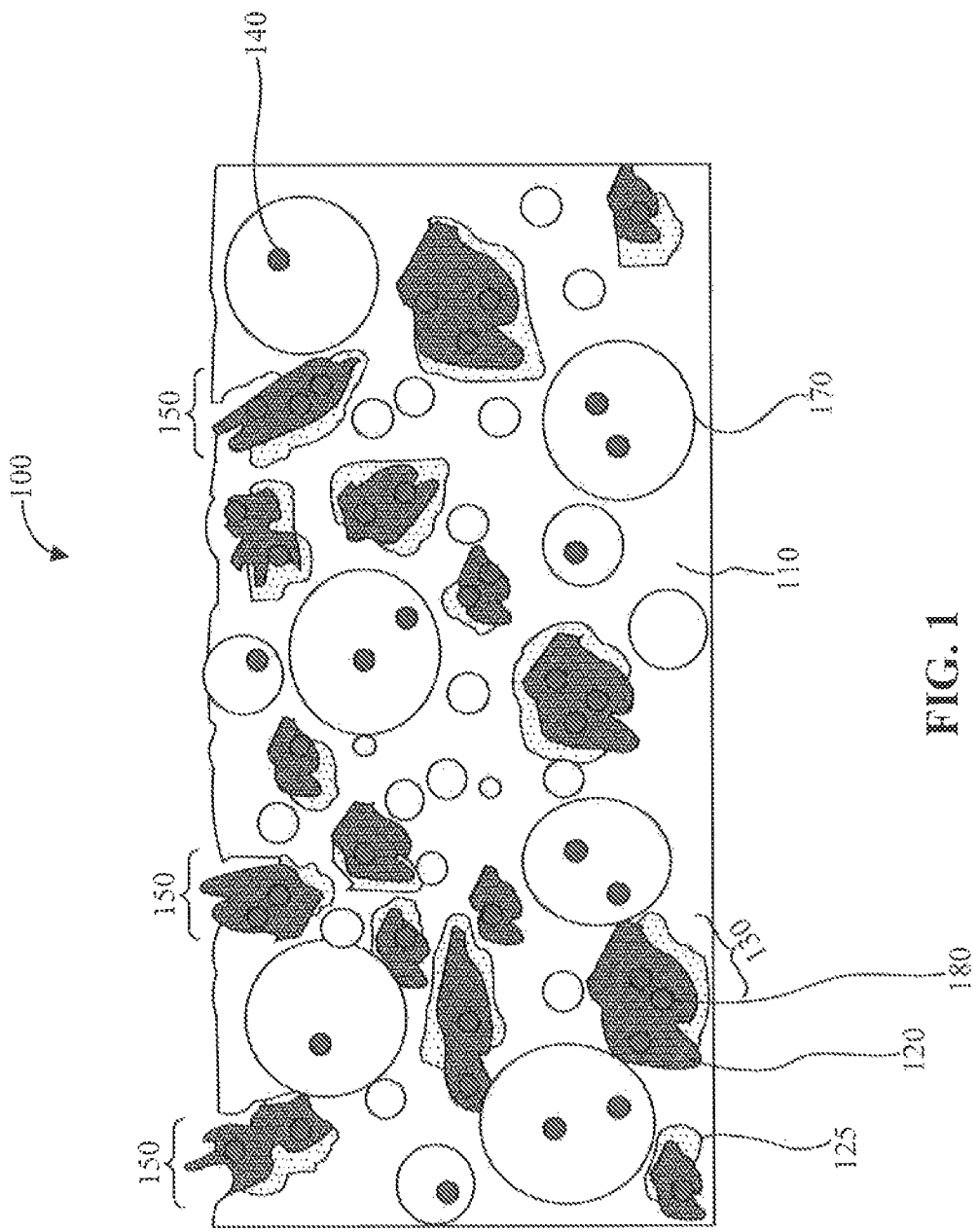
FIG. 1 illustrates a cross section of a self conditioning polishing pad in accordance with one exemplary embodiment of the present invention.

With reference now to FIG. 1, and in accordance with an exemplary embodiment, a polishing pad 100 comprises an insoluble polymeric foam matrix 110 and insoluble polymeric foam particles 120 within insoluble polymeric foam matrix 110. The insoluble polymeric foam particles 120 may be coated over a portion of the particles' surface area with a water-soluble coating 125. In an exemplary embodiment, the insoluble polymeric foam particles 120 are coated over a portion comprising about 5 to 90% of the particles' surface area with a water-soluble component 125. Insoluble polymeric foam particle 120 and water-soluble coating 125 together form a coated particle 130. In one example embodiment, the insoluble foam matrix 110 further comprises a pore 170. In on example embodiment, a pore 170 comprises a cell opening 140. In one example embodiment a coated particle 130 may further comprise a pore 180.

Particles

In an exemplary embodiment, insoluble polymeric foam particles 120 are formed by first making a larger insoluble polymeric foam object and then creating smaller particles out of the larger foam object. The smaller particles can be formed out of the larger foam object through any suitable method. In one exemplary embodiment, the larger foam object is ground into smaller particles. For example, the insoluble foam particles may be formed by cryogenically grinding the larger foam object. In other exemplary embodiments, particles may be formed in a hammer mill. Furthermore, any other suitable method for forming particles may be used.

In one exemplary embodiment, the insoluble polymeric foam particles have a diameter between about 5 and 500 microns. In another exemplary embodiment, the insoluble polymeric foam particles comprise at least one of: a surfactant, an etchant, pH buffer, an acid, and a base. Moreover, in another exemplary embodiment, the insoluble polymeric foam particles have a bulk density of about 0.2 to 0.85 g/cm^3.

Coating

In accordance with an exemplary embodiment, particles 120 are coated with a soluble coating. In one exemplary embodiment, particles 120 are coated through use of a spray coating or other suitable technology such as a cyclonic powder coater. In another exemplary embodiment, particles 120 are formed by making slurry of insoluble particles contained in a soluble liquid phase then drying and finally cryogrinding or hammer milling the solidified insoluble particle/soluble composite into particles. In an exemplary embodiment, particles 120 are dried and clarified after the spray coating. In this manner, a coated particle 130 comprises a particle 120 that is coated with a soluble coating 125. In another exemplary embodiment, the insoluble polymeric foam particles are coated over about 5% to 90% of the surface area of said insoluble polymeric foam particles. Coating of 5% to 90% of the insoluble foam particles can be accomplished, for example, by calculating the surface area of the particles and then proportionally blending the appropriate amount of water soluble polymer, in an exemplary embodiment, the coated particles comprise about 10% to 90% by volume of the polishing pad. In an exemplary embodiment, the soluble coating is comprised of organic or inorganic water-soluble particles. Specific examples of the organic water-soluble particles include particles of saccharides (polysaccharides, e.g., a, (3 or y-cyclodextrin, dextrin and starch, lactose, mannite, and the like), celluloses (hydroxypropyl cellulose, methylcellulose, and the like), proteins, a polyvinyl alcohol, a polyvinyl pyrrolidone, a polyacrylic acid, a polyacrylate, a polyethylene oxide, water-soluble photosensitive resins, a sulfonated polyisoprene, and a sulfonated polyisoprene copolymer.

In an exemplary embodiment, coated particles 130 are added into the mix during the process of forming matrix 110 of polishing pad 100. Thus, in an exemplary embodiment, coated particles 130 will be set within matrix 110.

In one exemplary embodiment, coated particles 130 are mixed into the matrix using high-shear blending. Other mixing methods include double planetary, kneading swing arm, and inline mixing with direct filler feed. Furthermore, any method of mixing may be used that is configured to randomly space out coated particles 130 within matrix 110. Moreover, the mixing process may entrain air bubbles within the foam (whether it be within the foam particles when forming them, or whether it may be within matrix 110). Furthermore any suitable method for introducing pores 140 within matrix 110 or for introducing pores 180 within particles 120 may be used. These methods may include ambient air frothing, water blown-$CO_2$ evolution, physical blowing agents such as HFC, decompositional blowing agents such as azonitriles, microspheres, and injected inert gasses.

Method of Making the Pad

In an exemplary embodiment, the insoluble foam object (that is to become the insoluble foam particles) is formed by mixing a polyurethane prepolymer, a curing agent, a surfactant, and a foaming agent. In some embodiments, an abrasive filler may also be mixed with the other ingredients. In some other embodiments, the insoluble foam object can be polyurethane foam, epoxy foam, polyethylene foam, polybutadiene foam, ionomer foam, or any other insoluble polymer foam. As mentioned above, the insoluble foam object may then be ground down into smaller insoluble foam particles 120. These particles 120 may then be coated to form insoluble coated foam particles 130. The coated particles 130 may then be included in the formation of the overall pad 100.

In an exemplary embodiment, polishing pad 100 is then formed by mixing a prepolymer, a curing agent, a surfactant, a foaming agent, and coated particles 130. In some embodiments, an abrasive filler may also be mixed with the other ingredients. The insoluble foam matrix can be polyurethane foam, epoxy foam, polyethylene foam, polybutadiene foam, ionomer foam, or any other insoluble polymer foam. The components may be mixed together using high-shear blending to incorporate the coated particles into the matrix. A foam bun may be formed in an open mold. The foam bun may be cured and then sliced into sheets. Each sheet comprises one polishing pad 100. In an exemplary embodiment, the pad comprises open cells 140. The open cell content of the insoluble polymeric foam particle may be about 5% to about 75%. In another exemplary embodiment, the soluble component coating the insoluble foam particle may be between 50% and 100% soluble. Moreover, in another exemplary embodiment, the insoluble polymeric foam matrix has a bulk density of 0.2 to 0.85 g/cm^3. Furthermore, in one exemplary embodiment, the foam bun may have an aggregate bulk density of 0.2 to 0.85 g/cm^3.

Matrix 110 and particle 120, in an exemplary embodiment, are both made of an insoluble foam material. In one embodiment, the materials for matrix 110 and particle 120 are identical to each other. In this regard, scrap material that is a byproduct of the production process can be used to create additional particles. In another exemplary embodiment, the materials are different from each other. The matrix and particle materials may be selected from any of a number of possible materials.

For example, in an exemplary embodiment, the insoluble foam material for either of matrix 110 and/or particle 120 may be made from a polymer foam. For example, in an exemplary embodiment, the polymer foam may be polyurethane, polyethylene, polystyrene, polyvinyl chloride, acryl foam or a mixture thereof. These polymer foams may be produced by mixing a polymerizing agent, for example, an isocyanate-terminated monomer, and a prepolymer, for example an isocyanate functional polyol or a polyol-diol mixture.

In an exemplary embodiment, classes of polymerizing agents or isocyanate-terminated monomers, that may be used to prepare the particulate crosslinked polyurethane include, but are not limited to, aliphatic polyisocyanates; ethylenically unsaturated polyisocyanates; alicyclic polyisocyanates; aromatic polyisocyanates wherein the isocyanate groups are not bonded directly to the aromatic ring, e.g., xylene diisocyanate; aromatic polyisocyanates wherein the isocyanate groups are bonded directly to the aromatic ring, e.g., benzene diisocyanate; halogenated, alkylated, alkoxylated, nitrated, carbodiimide modified, urea modified and biuret modified derivatives of polyisocyanates belonging to these classes; and dimerized and trimerized products of polyisocyanates belonging to these classes.

Examples of aliphatic polyisocyanates from which the isocyanate functional reactant may be selected include, but are not limited to, ethylene diisocyanate, trimethylene diisocyanate, tetramethylene diisocyanate, hexamethylene diisocyanate (HDI), octamethylene diisocyanate, nonamethylene diisocyanate, dimethylpentane diisocyanate, trimethyl hexane diisocyanate, decamethylene diisocyanate, trimethyl hexamethylene diisocyanate, undecanetriisocyanate, hexamethylene triisocyanate, diisocyanato-(isocyanatomethyl)octane, trimethyl-diisocyanato (isocyanatomethyl)octane, bis(isocyanatoethyl)carbonate, bis(isocyanatoethyl)ether, isocyanatopropyl-diisocyanatohexanoate, lysinediisocyanate methyl ester and lysinetriisocyanate methyl ester.

Examples of ethylenically unsaturated polyisocyanates from which the isocyanate functional reactant may be selected include, but are not limited to, butene diisocyanate and butadiene diisocyanate. Alicyclic polyisocyanates from which the isocyanate functional reactant may be selected include, but are not limited to, isophorone diisocyanate (IPDI), cyclohexane diisocyanate, methylcyclohexane diisocyanate, bis(isocyanatomethyl)cyclohexane, bis(isocyanatocyclohexyl)methane, bis(isocyanatocyclohexyl)propane, bis(isocyanatocyclohexyl)ethane, and isocyanatomethyl-(isocyanatopropyl)-isocyanatomethyl bicycloheptane.

Examples of aromatic polyisocyanates wherein the isocyanate groups are not bonded directly to the aromatic ring from which the isocyanate functional reactant may be selected include, but are not limited to, bis(isocyanatoethyl)benzene, tetramethylxylene diisocyanate, bis(isocyanato-methylethyl) benzene, bis(isocyanatobutyl)benzene, bis(isocyanatomethyl)naphthalene, bis(isocyanatomethyl)diphenyl ether, bis(isocyanatoethyl)phthalate, mesitylene triisocyanate and di(isocyanatomethyl)furan. Aromatic polyisocyanates, having isocyanate groups bonded directly to the aromatic ring, from which the isocyanate functional reactant may be selected include, but are not limited to, phenylene diisocyanate, ethylphenylene diisocyanate, isopropylphenyl diisocyanate, dimethylphenylene diisocyanate, diethylphenylene diisocyanate, diisopropylbenzene diisocyanate, trimethylbenzene triisocyanate, benzene triisocyanate, naphthalene diisocyanate, methylnaphthalene diisocyanate, biphenyl diisocyanate, ortho-tolidine diisocyanate, diphenylmethane diisocyanate, bis(methyl-isocyanatophenyl)methane, bis(isocyanatophenyl)ethylene, dimethoxy-bipheny-diisocyanate, triphenylmethane triisocyanate, polymeric diphenylmethane diisocyanate, naphthalene triisocyanate, diphenylmethane-triisocyanate, methyldiphenylmethane pentaisocyanate, diphenylether diisocyanate, bis(isocyanatophenylether)ethyleneglycol, bis(isocyanatophenylether)propyleneglycol, benzophenone diisocyanate, carbazole diisocyanate, ethylcarbazole diisocyanate and dichlorocabazole diisocyanate.

Examples of polyisocyanate monomers having two isocyanate groups include, xylene diisocyanate, tetramethylxylene diisocyanate, isophorone diisocyanate, bis(isocyanatocyclohexyl)methane, toluene diisocyanate (TDI), diphenylmethane diisocyanate (MDI), and mixtures thereof.

In an exemplary embodiment, commonly used prepolymers, isocyanate functional polyols, include, but are not limited to, polyether polyols, polycarbonate polyols, polyester polyols and polycaprolactone polyols. Furthermore, commercial prepolymers may be used, for example Adiprene® L213 a TDI, terminated polyether based (PTMEG).

Among exemplary embodiments, the molecular weight of the prepolymers can vary widely, for example, having a number average molecular (Mn) of from 500 to 15,000, or from 500 to 5000, as determined by gel permeation chromatography (GPC) using polystyrene standards.

Classes of polyols that may be used to prepare the isocyanate functional prepolymers of the first component of the exemplary two-component composition used to prepare the exemplary particulate crosslinked polyurethane include, but are not limited to: straight or branched chain alkane polyols, e.g., ethanediol, propanediol, propanediol, butanediol, butanediol, glycerol, neopentyl glycol, trimethylolethane, trimethylolpropane, di-trimethylolpropane, erythritol, pentaerythritol and di-pentaerythritol; polyalkylene glycols, e.g., di-, tri- and tetraethylene glycol, and di-, tri- and tetrapropylene glycol; cyclic alkane polyols, e.g., cyclopentanediol cyclohexanediol, cyclohexanetriol, cyclohexanedimethanol, hydroxypropylcyclohexanol and cyclohexanediethanol; aromatic polyols, e.g., dihydroxybenzene, benzenetriol, hydroxybenzyl alcohol and dihydroxytoluene; bisphenols, e.g., isopropylidenediphenol; oxybisphenol, dihydroxybenzophenone, thiobisphenol, phenolphthlalein, bis(hydroxyphenyl)methane, (ethenediyl)bisphenol and sulfonylbisphenol; halogenated bisphenols, e.g., isopropylidenebis(dibromophenol), isopropylidenebis(dichlorophenol) and isopropylidenebis(tetrachlorophenol); alkoxylated bisphenols, e.g., alkoxylated isopropylidenediphenol having from 1 to 70 alkoxy groups, for example, ethoxy, propoxy, and butoxy groups; and biscyclohexanols, which can be prepared by hydrogenating the corresponding bisphenols, e.g., isopropylidene-biscyclohexanol, oxybiscyclohexanol, thiobiscyclohexanol and bis(hydroxycyclohexanol)methane. Additional classes of polyols that may be used to prepare exemplary isocyanate functional polyurethane prepolymers include, for example, higher polyalkylene glycols, such as polyethylene glycols having number average molecular weights (Mn) of, for example, from 200 to 2000; and hydroxy functional polyesters, such as those formed from the reaction of diols, such as butane diol, and diacids or diesters, e.g., adipic acid or diethyl adipate, and having an Mn of, for example, from 200 to 2000. In an embodiment of the present invention, the isocyanate functional polyurethane prepolymer is prepared from a diisocyanate, e.g., toluene diisocyanate, and a polyalkylene glycol, e.g., poly(tetrahydrofuran) with an $M_n$ of 1000.

Additionally, the isocyanate functional polyurethane prepolymer may optionally be prepared in the presence of a catalyst. Classes of suitable catalysts include, but are not limited to, tertiary amines, such as triethylamine, and organometallic compounds, such as dibutyltin dilaurate.

In some exemplary embodiments, an abrasive filler may also form part of the insoluble foam particle 120 and/or insoluble foam matrix 110. This abrasive filler may include exemplary abrading particles that include, but are not limited to, particles of, for example, cerium oxides, silicon oxides, aluminum oxides, zirconia, iron oxides, manganese dioxides, kaolin clays, montmorillonite clays, and titanium oxides. Additionally, exemplary abrading particles may include, but are not limited to, silicon carbides and diamond.

Figure 3:
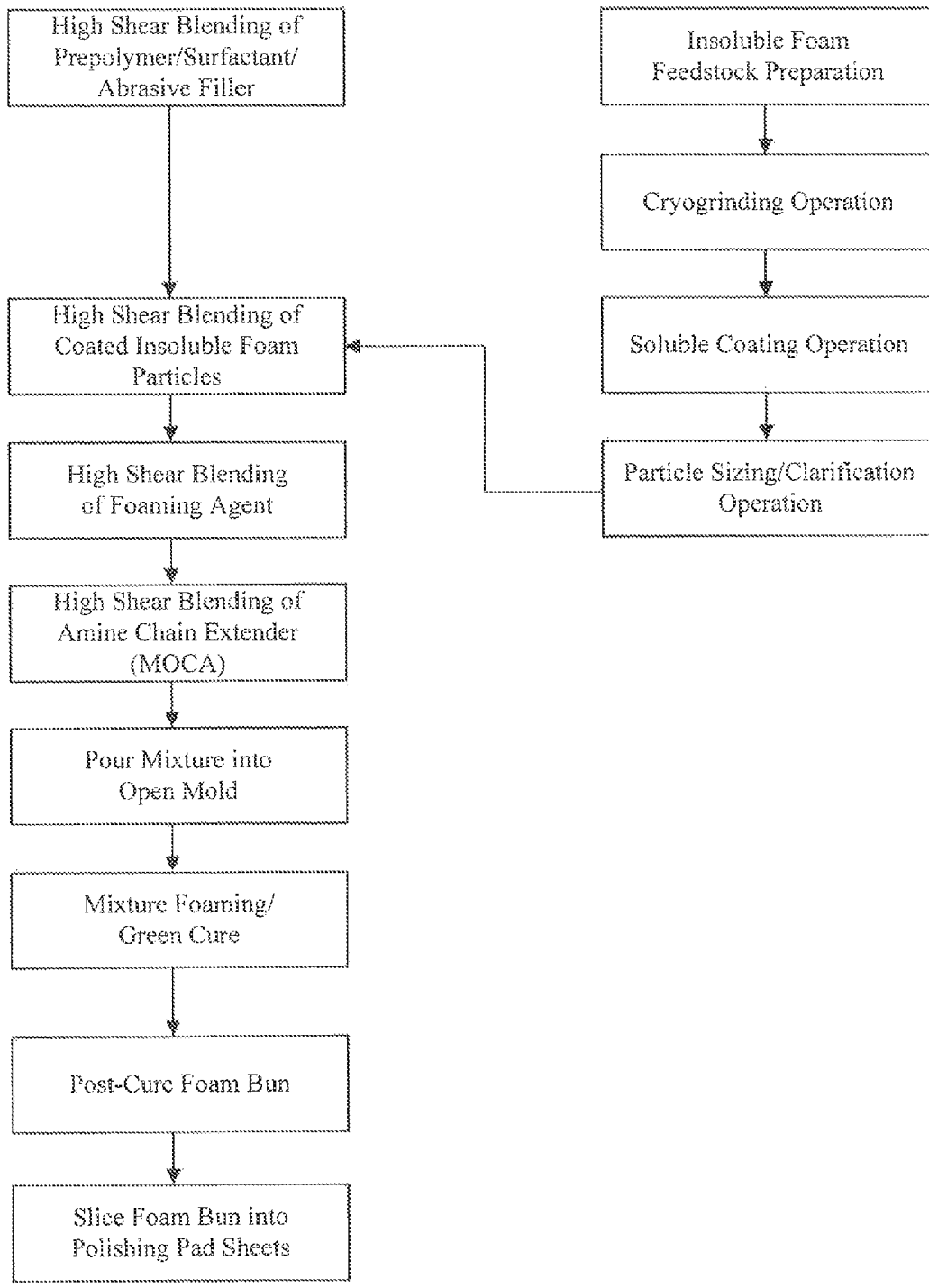
FIG. 3 illustrates an exemplary method flow chart for manufacturing an exemplary self conditioning pad in accordance with one exemplary embodiment of the present invention.

In some example embodiments, it is possible to manufacture urethane polymers for polishing pads with a single mixing step that avoids the use of isocyanate-terminated monomers. With reference now to FIG. 3, and as discussed above, in accordance with an exemplary embodiment of the present invention, a prepolymer is mixed, for example, in an open-air container with the use of a high-shear impeller. In an example embodiment, during the mixing process, atmospheric air is entrained in the mix by the action of the impeller, which pulls air into the vortex created by the rotation. The entrained gas bubbles act as nucleation sites for the foaming process. A blowing agent, such as water, may be added to the mix to facilitate a reaction which produces the $CO_2$ gas responsible for cell growth. During this open-air mix and while in the liquid phase, other optional additives may be added to the mix such as surfactants or additional blowing agents. The coated particles may be added and mixed in during this liquid phase. Furthermore, the prepolymer may be reacted with a foaming agent such as, 4,4'-methylene-bis-o-chloroaniline [MBCA or MOCA]. The MOCA may initiate polymerization and chain extension, causing the viscosity of the mix to increase rapidly. In some example embodiments, there is a short time window after the addition of MOCA of about 1-2 minutes during which the viscosity of the mix remains low, called the "low-viscosity window." The mix may be poured into the mold during this window. In one example embodiment, quickly after the pour, the window passes, and existing pores become effectively frozen in place. Although pore motion may essentially have ended, pore growth may continue, for example, as $CO_2$ continues to be produced from the polymerization reaction. In one example embodiment, the molds then oven cure to substantially complete the polymerization reaction, for example, for 6-12 hours at 115° C.

After oven curing, in one example embodiment, the molds are removed from the oven, and allowed to cool. At this point, a cured mold (one formed without particles) may be broken up into particles for use in a subsequent pad forming process. If the cured mold contains the coated particles, it may be sliced using a skiver, in one example embodiment, the slices may be made into circular pads or rectangular-shaped pads or pads of any other desired shape. For example, the slices may be made by cutting to shape with a punch or cutting tool or any other suitable instrument. In some example embodiments, an adhesive may be applied to one side of the pad. In some example embodiments, the pad surface may be grooved, if desired, for example, on the polishing surface in a pattern such as a cross-hatched pattern (or any other suitable pattern). In some example embodiments, at that point, the pads are generally ready for use.

Also, in an exemplary embodiment of the present invention, the geometry or shape of grooves may comprise at least one of a square trough, a rounded trough, and a triangular trough. In addition to the specific embodiments disclosed, numerous physical configurations of various geometries to the polishing pad surface are contemplated in this disclosure.

In addition to the specific embodiments disclosed, any arrangement, combination, and/or application of soluble coated insoluble foam particles within an insoluble foam matrix applicable for a single pad would work for a plurality of pads stacked on each other. For example, a stacked pad may comprise one such pad 100 as disclosed herein as well as a typical pad.

In addition to the exemplary pad surface configurations, methods for forming these pads are herein disclosed. In an exemplary embodiment of the present invention, grooves can be created via any mechanical method capable of producing grooves in a polymer foamed polishing pad. In an exemplary embodiment of the present invention, grooves can be created with a circular saw blade, a punch, a needle, a drill, a laser, an air-jet, a water jet, or any other instrument capable of rendering grooves in the pad. Moreover, grooves can be made simultaneously with a multiple gang-saw jig, a multiple-drill bit jig, a multiple punch jig, or a multiple needle jig.

Chemical Foaming Agents

In an exemplary embodiment of the present invention, the polishing pad may be chemically configured to comprise a chemical foaming agent applied to the open-air mix while in the liquid phase. In an exemplary embodiment of the present invention, the chemical foaming agent comprises at least one of a hydroflourocarbon (HFC) or azeotrope of 2 or more hydrocarbon (HFCs), such as 1,1,1,3,3-pentaflourobutane (HFC-365); 1,1,1,2-tetraflouroethane (HFC-134a), methoxy-nonafluorobutane (HFE-7100) and a free radical initiator comprising an azonitrile, such as 2,4-Dimethyl, 2,2'-Azobis Pentanenitrile. Exemplary foaming agents include the HFCs Solkane® 365mfc and 134a (Solvay, Hannover, Germany), and free radical initiators Vazo 52 (Dupont, Wilmington, Del.). One of reasonable skill in the art will recognize that, in addition to the specific embodiments disclosed, numerous chemical foaming agents can be incorporated into the polishing pad and are contemplated in this disclosure.

Cell Openers

In an exemplary embodiment of the present invention, the chemical configuration comprises a cell opener which promotes cell opening during the interaction of two cells in the liquid phase. Exemplary cell openers include, but are not limited to non-hyrdrolizable polydimethylsiloxanes, poly-alkyleoxides, dimethylsiloxy, methylpolyethersiloxy, silicone copolymers, wherein in some exemplary embodiments, the silicone copolymers can be Dabco DC-3043 or Dabco DC-3042 (Air Products, Allentown, Pa.).

Direct Introduction of Bubbles

In some exemplary embodiments, in addition to chemical foaming agents and cell openers, it may be possible to directly introduce gas bubbles into the mix, during the mix process. For example, while the mix is still in the liquid state, such as before the addition of MOCA, or after the addition of MOCA but within the low-viscosity window, or at any other suitable time, the output of a gas injector can be inserted directly into the open-air mix, causing the injection of more bubbles than would otherwise be introduced thorough the action of the impeller alone. Optionally, one may apply micro-filtration to the output end of a pump, such as a gas injector pump, to promote the formation of very small bubbles, such as those in the 1-10 micron diameter range, in accordance with another exemplary embodiment of the present invention, a method of forming a pad includes the step of directly introducing gas bubbles into the air-mix in the liquid phase. This step of directly introducing gas bubbles may involve the selection of the size and quantity of bubbles.

Figure 2:
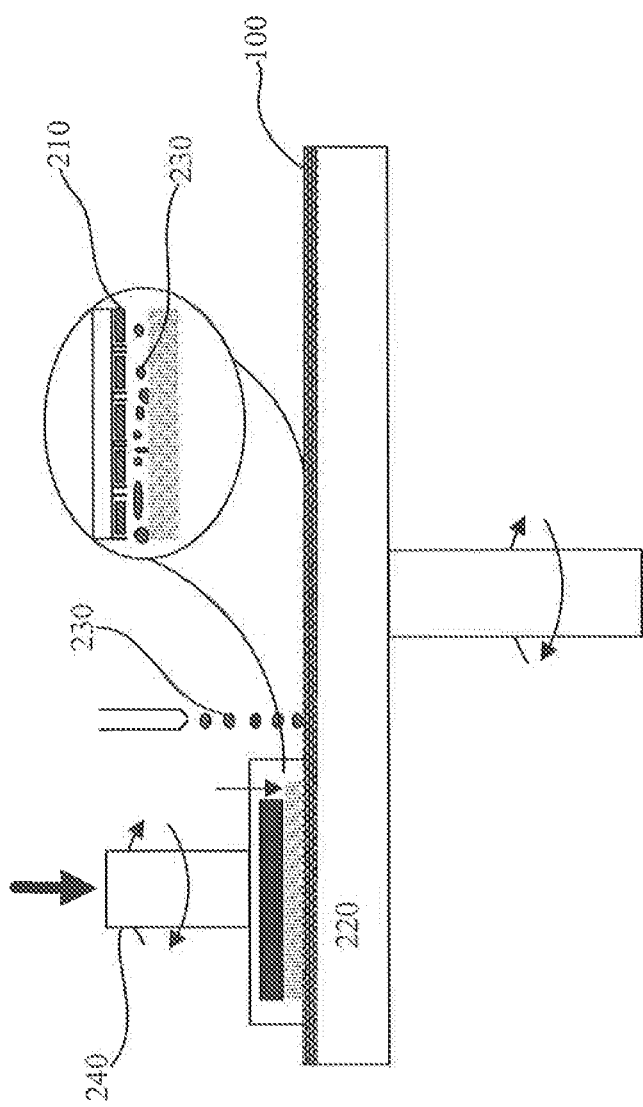
FIG. 2 illustrates a self conditioning polishing pad, the part to be polished, and a polishing tool, all in accordance with one exemplary embodiment of the present invention.

With reference to FIG. 2, in one exemplary embodiment, polishing pad 100 may be used in connection with a polishing table 220, a slurry 230, and a platen 240 for holding the object 210 to be polished. The pad 100 may be moved relative to the object 210 being polished. In some exemplary embodiments, downward pressure may be applied to a platen 240. In some exemplary embodiments, platen 240 may be twisted or translated or otherwise moved to facilitate polishing. In some example embodiments, polishing table 220 may be twisted or translated or otherwise moved to facilitate polishing. During the polishing process, the pad 100 may self condition such that polishing may occur for a longer period of time than for a traditional polishing pad that is not so configured. In one exemplary embodiment, the polishing pad is never reconditioned.

With reference to FIG. 1, in an exemplary embodiment, the embedding of these coated particles 120 facilitates reduced conditioning or may eliminate conditioning of the pad 100 because, as the particles 120 are exposed during polishing, the water soluble coating 125 will cause those particles to gradually become detached from the surface of the pad. Stated another way, the water-soluble coating 125 surrounding exposed particles 150 may dissolve and release the exposed particles 150 from the pad. This action generates new holes in the surface and eventually exposes yet further coated particles. Such self conditioning may reduce the need to "rake" the pad, and cause the pad to last longer.

In one example embodiment the insoluble polymeric foam particles are coated over about 5% to 90% of the surface area of said insoluble polymeric foam particles. The partial nature of the water-soluble coating over the surface area of the insoluble polymeric foam particles allows the insoluble foam matrix to interface with insoluble portions of the foam particles, retaining the foam particle by providing a polyurethane-polyurethane bond with the pad matrix in an exemplary embodiment and retarding the release of the foam particles from the pad as the water-soluble coating surrounding exposed particles dissolves.

In one example embodiment, the progressive dissolving of the water-soluble coating progressively diminishes the strength of the bond between the particles and the matrix. Accordingly, if the insoluble polymeric foam particles are coated over an insufficient percentage of the surface area of said insoluble polymeric foam particles, the bond between the particles and the matrix would not sufficiently diminish over time and the release of the particles from the pad may be impeded. This may retard the generation of new holes in the surface. On the other hand, if the insoluble polymeric foam particles are coated over an excessive percentage of the surface area of said insoluble polymeric foam particles, the bond between the particles and the matrix would diminish prematurely or excessively as the water soluble coating dissolved, releasing the particle prematurely. This may diminish the life of the pad or potentially change the polishing characteristics of the pad.

The detailed description of exemplary embodiments of the invention herein shows various exemplary embodiments and the best modes, known to the inventors at this time, of the invention are disclosed. These exemplary embodiments and modes are described in sufficient detail to enable those skilled in the art to practice the invention and are not intended to limit the scope, applicability, or configuration of the invention in any way. Rather, the following disclosure is intended to teach both the implementation of the exemplary embodiments and modes and any equivalent modes or embodiments that are known or obvious to those of reasonably skill in the art. Additionally, all included figures are non-limiting illustrations of the exemplary embodiments and modes, which similarly avail themselves to any equivalent modes or embodiments that are known or obvious to those of reasonable skill in the art.

Other combinations and/or modifications of structures, arrangements, applications, proportions, elements, materials, or components used in the practice of the instant invention, in addition to those not specifically recited, can be varied or otherwise particularly adapted to specific environments, manufacturing specifications, design parameters, or other operating requirements without departing from the scope of the instant invention and are intended to be included in this disclosure.

Unless specifically noted, it is the Applicant's intent that the words and phrases in the specification and the claims be given the commonly-accepted generic meaning, or an ordinary and accustomed meaning used by those of ordinary skill in the applicable arts. In the instance where these meanings differ, the words and phrases in the specification and the claims should be given the broadest possible, generic meaning. The words and phrases in the specification and the claims should be given the broadest possible meaning. If any other special meaning is intended for any word or phrase, the specification will clearly state and define the special meaning.

What is claimed is:

1. A polishing pad comprising:
   an insoluble polymeric foam matrix; and
   a plurality of coated particles, wherein said plurality of coated particles each comprise insoluble polymeric foam particles coated with a water-soluble component, wherein said insoluble polymeric foam particles are coated over about 5% to 90% of the surface area of said insoluble polymeric foam particles with the water-soluble component in order to provide an effective bond between the insoluble polymeric foam matrix and the insoluble polymeric foam particles.

2. The polishing pad of claim 1, wherein said insoluble polymeric foam particles have a diameter between about 5 and 1000 microns.

3. The polishing pad of claim 1, wherein said insoluble polymeric foam matrix is the product of mixing a prepolymer, a curing agent, a surfactant, and at least one of: a foaming agent or an abrasive filler.

4. The polishing pad of claim 1, wherein said coated particles comprise about 10% to 90% by volume of the polishing pad.

5. The polishing pad of claim 1, wherein said water-soluble component comprises a water-soluble organic or inorganic compound and at least one of: a surfactant, an etchant, a pH buffer, an acid, and a base.

6. The polishing pad of claim 1, wherein the polishing pad comprises open cells, and wherein an open cell content of the insoluble polymeric foam particles is about 5% to about 75%.

7. The polishing pad of claim 1, wherein the water-soluble component of the particle coating may be between 50% and 100% soluble.

8. The polishing pad of claim 7, wherein the insoluble polymeric foam particles have a bulk density of about 0.2 to 0.85 g/cm$^3$.

9. The polishing pad of claim 1, wherein the insoluble polymeric foam matrix has a bulk density of 0.2 to 0.85 g/cm$^3$.

10. The polishing pad of claim 1, wherein the insoluble polymeric foam particles are formed by breaking an insoluble polymeric foam object into relatively smaller insoluble polymeric foam objects.

11. A method of producing a self-conditioning polishing pad comprising:
    forming a plurality of coated insoluble polymeric foam particles;
    preparing a prepolymer solution;

mixing said prepolymer solution in an open-air mix, wherein at least one of a gas bubble and a blowing agent are added to said open-air mix;

adding said plurality of coated insoluble polymeric foam particles to the mix, wherein said plurality of coated insoluble polymeric foam particles comprise a plurality of insoluble polymeric foam particles that are coated with a water-soluble component;

adding a polymerizing agent to the mix;

allowing the mixture to foam;

pouring said mixture into an open mold;

curing said mixture to form a foam bun wherein said foam bun has an aggregated bulk density of 0.2 to 0.85 g/cm$^3$; and forming a foamed polishing pad out of said foam bun by slicing individual pads out of said foam bun, wherein the foamed polishing pad comprises an insoluble polymeric foam matrix, and wherein said insoluble polymeric foam particles are coated over about 5% to 90% of the surface area of said insoluble polymeric foam particles with the water-soluble component in order to provide an effective bond between the insoluble polymeric foam matrix and the insoluble polymeric foam particles.

12. The method of claim 11, wherein said insoluble polymeric foam matrix is the product of mixing a prepolymer, a curing agent, a surfactant, and at least one of: a foaming agent or an abrasive filler.

13. The method of claim 11, wherein said plurality of insoluble polymeric foam particles are between 5 to 1000 microns in diameter.

14. The method of claim 11, wherein said plurality of insoluble polymeric foam particles are formed by cryogenically grinding a larger insoluble polymeric foam object to form particles.

15. The method of claim 11, wherein said plurality of coated insoluble polymeric foam particles are coated by spray coating.

16. The method of claim 15, wherein said plurality of coated insoluble polymeric foam particles are dried and clarified.

17. The method of claim 11, comprising creating a groove with a mechanical device in the self-conditioning polishing pad.

18. The method of claim 11, comprising:

adding at least one of a chemical foaming agent, wherein said chemical foaming agent allows for formation of a plurality of small pores in the foam, and a cell opener, wherein said cell opener allows for formation of a plurality of small cells in the foam, to said prepolymer solution; and adding at least one abrading particle to said prepolymer solution.

19. The method of claim 11, wherein said insoluble polymeric foam particles are the product of mixing a prepolymer, a curing agent, a surfactant, and at least one of: a foaming agent or an abrasive filler.

* * * * *